(12) United States Patent
Lang et al.

(10) Patent No.: US 9,403,731 B2  
(45) Date of Patent: Aug. 2, 2016

(54) MODIFIED AMINOCARBOXYLATES WITH IMPROVED STORAGE STABILITY AND PROCESSABILITY

(75) Inventors: Frank-Peter Lang, Hattersheim (DE); Markus Hartmann, Neustadt (DE); Alejandra Garcia Marcos, Ludwigshafen (DE); Stephan Hueffer, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 122 days.

(21) Appl. No.: 13/533,054

(22) Filed: Jun. 26, 2012

(65) Prior Publication Data

US 2013/0000370 A1   Jan. 3, 2013

Related U.S. Application Data

(60) Provisional application No. 61/502,345, filed on Jun. 29, 2011.

(51) Int. Cl.
| | |
|---|---|
| C11D 3/33 | (2006.01) |
| C11D 7/14 | (2006.01) |
| C11D 7/32 | (2006.01) |
| C05D 9/02 | (2006.01) |
| C11D 3/12 | (2006.01) |
| C11D 3/20 | (2006.01) |
| C11D 3/22 | (2006.01) |
| C11D 7/02 | (2006.01) |
| C11D 7/20 | (2006.01) |
| C11D 7/26 | (2006.01) |
| C11D 7/44 | (2006.01) |
| C11D 9/00 | (2006.01) |
| C11D 9/30 | (2006.01) |
| C11D 17/00 | (2006.01) |
| C02F 5/12 | (2006.01) |

(52) U.S. Cl.
CPC ........ C05D 9/02 (2013.01); C11D 3/126 (2013.01); C11D 3/1213 (2013.01); C11D 3/1226 (2013.01); C11D 3/1246 (2013.01); C11D 3/2079 (2013.01); C11D 3/222 (2013.01); C11D 3/33 (2013.01); C11D 7/02 (2013.01); C11D 7/20 (2013.01); C11D 7/265 (2013.01); C11D 7/3245 (2013.01); C11D 7/44 (2013.01); C11D 9/002 (2013.01); C11D 9/30 (2013.01); C02F 5/125 (2013.01); C11D 17/0039 (2013.01)

(58) Field of Classification Search
CPC .... C11D 3/124; C11D 3/1246; C11D 3/1253; C11D 3/126; C11D 3/33; C11D 17/0047; C11D 17/06; C11D 17/065; C11D 17/0039
USPC ........ 510/294, 361, 444, 445, 446, 447, 488, 510/499, 507, 511, 441
See application file for complete search history.

(56) References Cited

U.S. PATENT DOCUMENTS

| | | | |
|---|---|---|---|
| 3,128,287 A | 4/1964 | Berg | |
| 3,635,830 A | 1/1972 | Lamberti et al. | |
| 3,985,669 A | 10/1976 | Krummel et al. | |
| 4,395,273 A | 7/1983 | Leutner et al. | |
| 4,605,509 A | 8/1986 | Corkill et al. | |
| 4,663,071 A | 5/1987 | Bush et al. | |
| 4,664,839 A | 5/1987 | Rieck | |
| 5,362,413 A * | 11/1994 | Kaufmann et al. | 510/296 |
| 5,691,296 A | 11/1997 | Agar et al. | |
| 6,080,708 A | 6/2000 | Glenn, Jr. et al. | |
| 6,162,259 A | 12/2000 | Williams | |
| 6,274,664 B1 * | 8/2001 | Emery et al. | 524/492 |
| 6,620,854 B2 * | 9/2003 | Schnyder et al. | 514/717 |
| 2003/0087790 A1 * | 5/2003 | Puelle Andrade et al. | 510/444 |
| 2003/0130157 A1 * | 7/2003 | Dontula et al. | 510/446 |
| 2004/0052736 A1 | 3/2004 | Yang et al. | |
| 2006/0030155 A1 | 2/2006 | Kim et al. | |
| 2007/0066506 A1 * | 3/2007 | Behler et al. | 510/424 |
| 2007/0128129 A1 * | 6/2007 | Stehr et al. | 424/50 |
| 2009/0068839 A1 | 3/2009 | Kim et al. | |
| 2009/0075855 A1 | 3/2009 | Gibis et al. | |
| 2011/0086115 A1 | 4/2011 | Mercier et al. | |
| 2011/0124545 A1 * | 5/2011 | Mort et al. | 510/220 |

FOREIGN PATENT DOCUMENTS

| | | |
|---|---|---|
| CN | 102408803 A | 4/2012 |
| DE | 102 47 201 A1 | 12/2003 |
| EP | 0 053 246 A1 | 6/1982 |
| EP | 2 380 962 A1 | 10/2011 |
| GB | 2 311 535 A | 10/1997 |
| GB | 2 311 538 A | 10/1997 |
| GB | 2 487 298 A | 7/2012 |
| JP | 2009-46635 A | 5/2009 |
| KR | 10-2004-0050564 | 6/2004 |
| WO | WO 94/29421 A1 | 12/1994 |
| WO | WO 200066688 | 11/2000 |
| WO | WO 2007/052004 A1 | 5/2007 |
| WO | WO 2007/119054 | 10/2007 |
| WO | WO 2009/101593 A2 | 8/2009 |
| WO | WO 2010/076291 A1 | 7/2010 |

OTHER PUBLICATIONS

Evonik Industries, Specialty Silica, p. 1-36, Feb. 2012.*
U.S. Appl. No. 13/405,534, filed Feb. 27, 2012, Lang.
U.S. Appl. No. 13/405,820, filed Feb. 27, 2012, Lang, et al.
U.S. Appl. No. 13/533,083, filed Jun. 26, 2012, Hueffer, et al.
International Search Report issued Sep. 27, 2012, in PCT/EP2012/062187 (with English Translation of Categories of Cited Documents).

* cited by examiner

*Primary Examiner* — Gregory R Delcotto
(74) *Attorney, Agent, or Firm* — Oblon, McClelland, Maier & Neustadt, L.L.P.

(57) ABSTRACT

The invention relates to aminocarboxylates in solid form which have a relatively high storage stability and improved processability, and to the use thereof in household products, in particular detergents, cleaners and care compositions, and in industrial processes.

16 Claims, No Drawings

MODIFIED AMINOCARBOXYLATES WITH IMPROVED STORAGE STABILITY AND PROCESSABILITY

The invention relates to aminocarboxylates in solid form which have a relatively high storage stability and improved processability, and to the use thereof in household products, in particular detergents, cleaners and care compositions, as trace nutrient fertilizers for plants, and in industrial processes.

Aminocarboxylates are a very important group of complexing agents. Complexing agents, in particular the aminocarboxylates, nowadays play an important role in all processes in which water participates. A central problem here is the disturbance of these processes as a result of the introduction of undesired metal ions, such as e.g. of the hardness formers of water $Ca^{2+}$ and $Mg^{2+}$, of $Ba^{2+}$ and of heavy metal ions. The cause of process disturbances is, on the one hand, often the formation of sparingly soluble precipitates of alkaline earth metal salts or heavy metal salts. The consequence is e.g. deposits on heat exchanger surfaces and thus an adverse effect on heat transfer or blockages of lines, valves or nozzles. In addition, catalytic reactions are triggered by certain heavy metal ions, such as $Fe^{3+}$, $Mn^{2+}$ or $Cu^{2+}$. They can lead to an undesired decomposition of formulation constituents, e.g. the decomposition of hydrogen peroxide during the bleaching of pulp in papermaking or the decomposition of the bleaching system in universal detergents. To avoid these troublesome effects, the masking of the metal ions by complexing agents has proven to be most successful. This lowers the concentration of free metal ions such that, for example, the formation of sparingly soluble precipitates or the catalysis of undesired chemical reactions is avoided. On account of their good stability compared with other formulation constituents or processing auxiliaries, such as acids, alkalis, oxidizing or reducing agents, and also towards thermal influences, the aminocarboxylates find a large number of highly diverse fields of use as complexing agents.

Aminocarboxylates are used for example in the following fields of application: for softening water, in particular of boiler feed water; in detergents for textiles, for the purpose of improving primary detergency and secondary detergency (reduction in fabric encrustation and graying), and also for avoiding deposits on heating rods and for stabilizing the bleaching system (perborate, percarbonate) in standard detergents and bleaches; in soaps for avoiding rancidification and for avoiding discolorations, both caused by traces of heavy metals; in acidic, neutral or alkaline cleaners for domestic and commercial use, e.g. in car cleaning compositions, low-temperature cleaners, all-purpose cleaners, disinfectant cleaners, dairy cleaners, sanitary cleaners, bottle-washing compositions and in machine dishwashing detergents; in the manufacture of paper and pulp, such as the bleaching of pulp, groundwood bleaching and deinking during the recycling of waste paper; in metal pretreatment such as the cleaning of iron, steel, zinc, tin, aluminum, copper, brass and other metals for avoiding precipitates from alkaline earth metal and heavy metal phosphates, carbonates, silicates, soaps and insoluble salts of anionic surfactants on apparatus parts and the surfaces to be cleaned; in surface technology, such as e.g. a) in electroplating baths for improving the stability of the baths and optimizing the reactions occurring at the anode and the cathode, and b) currentless, chemical copper plating; in metal working for producing emulsion and solution concentrates such as e.g. lubricants and impregnating compositions, drilling oils, drawing oil emulsions, water-thinnable and water-soluble metal working auxiliaries, hydraulic solutions and emulsions; in textile finishing in processing and finishing operations such as scouring, kiering, bleaching, dyeing and resin finishing of the fabrics; in leather manufacture for vegetable tanning, particularly in the case of iron-containing water; in photographic baths, especially here for the complexation of $Ca^{2+}$, $Fe^{2+}$ and $Cu^{2+}$ such as e.g. a) in developer baths for avoiding deposits of calcium sulfite and calcium sulfate, which lead to fogging on the photographic layers and contaminate the developing devices, and b) in bleaching and bleach-fixing baths during the processing of color photographic materials, in particular $Fe^{3+}$-EDTA complexes for carrying out bleaching and fixing in one process step; in cosmetic products (in particular EDTA) for masking heavy metal ions for avoiding rancidification and discolorations; in trace nutrient fertilizers (micronutrients), in particular EDTA, in the form of the complexes with important trace elements such as iron, manganese, magnesium, copper, zinc, molybdenum or cobalt for agricultural crops (e.g. in the cultivation of wine, fruit and hops) for retarding the supply with trace elements; in the production and processing of rubber for protecting against heavy metals, in particular traces of copper and manganese, which are already present in the crude rubber as a contaminant and may additionally be introduced by additives, e.g. pigments, and which bring about premature aging of the rubber; in the production of synthetic rubber, in particular butadiene-styrene copolymers, as a constituent of redox catalyst systems; in metallurgy, e.g. as metal stripper as a constituent of stripping solutions for removing unsuccessful metal coatings (e.g. of nickel) or in derusting and descaling baths; as additive in printing inks, e.g. in offset printing for avoiding greasing and build-up; in water treatment for avoiding or removing deposits of calcium sulfate, calcium carbonate or calcium phosphate in boilers, evaporation plants, heat exchangers or on filters; in flue-gas scrubbing, e.g. in the form of EDTA chelates, for removing $NO_X$ and $SO_2$ from the flue gases, e.g. by means of the so-called simultaneous process; for removing deposits, in particular magnetite, in the steam generators of thermal power plants, and also in heating cycles; in paints, particularly in emulsion paints; in food processing; in the pharmaceutical industry; in fine chemical separation methods, e.g. for obtaining rare earths; as eluent in certain separation processes with the help of ion exchangers and in many other industrial applications.

More details on the aforementioned fields of application of complexing agents can be found in the brochures "Trilon® complexing agents" and "Industrial cleaners" from BASF.

The aminocarboxylates used as complexing agents include e.g. the salts of the following aminocarboxylic acids: nitrilotriacetic acid (NTA), ethylenediaminetetraacetic acid (EDTA), diethylenetriaminepentaacetic acid (DTPA), hydroxyethylethylenediaminetriacetic acid (HEDTA), methylglycinediacetic acid (MGDA), glutamic acid diacetic acid (GLDA), 1,3-propylenediaminetetraacetic acid (PDTA), ethylenediamine-N,N'-bis(2-hydroxyphenylacetic acid) (EDDHA), hydroxyethyliminodiacetic acid (HEIDA), iminodisuccinic acid (IDS), ethylenediaminedisuccinic acid (EDDS), β-alaninediacetic acid (β-ADA). The aminocarboxylates are commercially available as free aminocarboxylic acid and completely or partially neutralized as Li salt, Na salt, as K salt, as ammonium salt, as Mg salt, as Ca salt or in the form of mixed salts, e.g. as Na—Ca salts. In addition, they are also supplied commercially in the form of their metal chelates, e.g. with $Cu^{2+}$, $Mn^{2+}$, $Zn^{2+}$, $Fe^{2+}$, $Fe^{3+}$, $Cr^{3+}$ or $Co^{2+}$.

For using aminocarboxylates in the fields of application described above, aminocarboxylates are supplied as aqueous solution or in solid form, as powders, as granules or pellets.

Aqueous solutions have the disadvantage that they can only be prepared with relatively low solids contents, which increases the transportation costs to the customer.

In addition, for warehousing, they require heatable tanks and corresponding systems to make them available to the respective industrial application, such as e.g. pumps, pipelines and nozzles, which constitutes a not inconsiderable technical expenditure.

The commercially available solid forms of the aminocarboxylates such powders, granules or pellets in turn have the disadvantage that they are highly hygroscopic. This is a considerable hindrance to their handling, particularly in climatic zones with relatively high humidity. Consequently, controlled climatic conditions often have to be provided, which likewise entails significant technical expenditure. Also, opened packs have to be hermetically sealed again, depending on the aminocarboxylate, which is not possible in the case of sacks or big bags. Irrespective of their hygroscopicity, the aminocarboxylates exhibit in powder form, as a result of high cohesive forces between the particles, also a very poor flow behavior, which considerably hinders conveyance and exact metering e.g. in the production of washing powder. Finally, the products exhibit poor storage stability upon the mechanical action of pressure, such as during the stacking of big bags on the packaged products.

It is therefore the object of the present invention to provide free, partially neutralized or completely neutralized aminocarboxylic acids in the form of powders, granules or pellets which have good physical stability and which are easy to store and process by the user.

It has now been found that this aim can be achieved by adding at least one additive (B) to the aminocarboxylate (A) present in solid form. In this connection, aminocarboxylate (A) can be present in pure form or as a mixture with one or more auxiliaries (C), e.g. as granules or pellets, which can then be treated with the additive(s) (B).

The invention therefore provides a mixture comprising one or more aminocarboxylate(s) (A) and additive(s) (B), selected from fatty acid salts (also called metal soaps), cellulose, magnesium oxide, talc, tricalcium phosphate, pyrogenic silicas and precipitated silicas, and optionally (C) at least one auxiliary.

A mixture which is present in pulverulent, granule or pellet form, is preferred here.

Within the context of this application, pulverulent substances have a particle diameter of at least 1 µm to at most 0.1 mm, granular substances have a particle diameter of from at least 0.1 mm to at most 2 mm and pellet-like substances have a particle diameter of from at least 2 mm to at most 5 mm (in each case determined by sieve analysis).

Aminocarboxylates (A) which can be used are the following aminocarboxylic acids: ethylenediamindi(o-hydroxyphenyl)acetic acid (EDDHA); ethylenediamine-N-(o-hydroxyphenyl)acetic acid-N'-(p-hydroxyphenyl)acetic acid (EDDHA), 2-hydroxyethylene-diaminetriacetic acid (HEEDTA), ethylenediamindi(o-hydroxy-o-methylphenyl)acetic acid (EDDHMA), ethylenediamindi(o-hydroxy-p-methylphenyl)acetic acid (EDDHMA), ethylenediamindi(p-hydroxy-o-methylphenyl)acetic acid (EDDHMA), ethylenediamindi(2-hydroxy-4-carboxyphenyl)acetic acid (EDDCHA), ethylenediamindi(2-carboxy-5-hydroxy-phenyl)acetic acid (EDDCHA), ethylenediamindi(5-carboxy-2-hydroxyphenyl)acetic acid (EDDCHA); or preferably nitrilotriacetic acid (NTA), ethylenediaminetetraacetic acid (EDTA), diethylenetriaminepentaacetic acid (DTPA), hydroxyethylethylenediaminetriacetic acid (HEDTA), methylglycinediacetic acid (MGDA), glutamic acid diacetic acid (GLDA), 1,3-propylenediaminetetraacetic acid (PDTA), ethylenediamine-N,N'-bis(2-hydroxyphenylacetic acid) (EDDHA), hydroxyethyliminodiacetic acid (HEIDA), iminodisuccinic acid (IDS), ethylenediaminedisuccinic acid (EDDS), β-alaninediacetic acid (β-ADA).

Aminocarboxylates (A) can be used here as free aminocarboxylic acids or completely or partially neutralized as Na salt, as K salt, as Ba salt, as Li salt, as ammonium salt, as Mg salt, as Ca salt or in the form of any desired mixed salts, such as e.g. as Na/Ca salts. The term ammonium salt here encompasses salts of aminocarboxylic acids with ammonia or with primary, secondary or tertiary amines R—$NH_2$, $R_1$—NH—$R_2$ and $NR_1R_2R_3$ where R, $R_1$, $R_2$, $R_3$, independently of one another, are C1- to C18-alkyl, benzyl, ethylphenyl, cyclohexyl or phenyl.

Aminocarboxylate (A) can also be present in the form of its metal chelate, e.g. with $Al^{3+}$, $Cr^{3+}$, $Co^{2+}$, $Cu^{2+}$, $Fe^{2+}$, $Fe^{3+}$, $Mn^{2+}$, $Ni^{2+}$, $Sr^{2+}$, $Zn^{2+}$, $Sn^{2+}$ in the mixtures according to the invention.

Suitable additives (B) are e.g. metal soaps, that is fatty acid salts, in particular of $C_{12}$-$C_{22}$ fatty acids, such as lauric acid, palmitic acid, oleic acid, tallow fatty acid, stearic acid, behenic acid, preferably with alkaline earth metal ions, particularly preferably with $Ca^{2+}$ and $Mg^{2+}$; cellulose powder; magnesium oxide; kaolin; talc, tricalcium phosphate and silicas. The term additive (B) here also encompasses mixtures of at least two of the abovementioned substances.

The preferred additives (B) include metal soaps, for example salts of $C_{12}$-$C_{22}$ fatty acids, preferably the $Ca^{2+}$ and $Mg^{2+}$ salts of $C_{12}$-$C_{22}$ fatty acids, in particular Ca stearate and Mg stearate.

Particularly preferred additives (B) are pyrogenic silicas and precipitated silicas. Pyrogenic silicas are obtained by high-temperature flame hydrolysis of silicon tetrachloride in the oxyhydrogen flame. Precipitated silicas are obtained by wet-chemical methods from alkali metal silicate solutions by adding acids. In this connection, the pyrogenic silicas like the precipitated silicas are not crystalline, but are of amorphous structure.

Examples of pyrogenic silicas are the Aerosil® grades (Evonik), in particular Aerosil® 200. Examples of precipitated silicas are the Sipernat® grades (Evonik), in particular Sipernat® 320, Sipernat® 320 DS, Sipernat® 360, Sipernat® 500 LS, Sipernat® 2200, Sipernat® 22, Sipernat® 22 S, Sipernat® 22 LS, Sipernat® 50, Sipernat® 50 S, Sipernat® C 600, Sipernat® C 630, Sipernat® 820 A and Sipernat® 880.

In mixtures according to the invention, it is possible to use the aforementioned hydrophilic silicas or else hydrophobically modified silicas. Hydrophobic silicas are, for example, Sipernat® D 10, Sipernat® D 17 and Aerosil® R 812 and R 972. Hydrophobically modified precipitated silicas and hydrophobically modified pyrogenic silicas are very particularly preferred additives.

Hydrophobically modified silicas are obtainable by after-treating silicas with after-treatment agents such as silanes, for example trimethylchlorosilane or dimethyldichlorosilane, or with siloxanes. In hydrophobically modified silicas, the after-treatment agent is joined to the silica via a chemical bond.

In one embodiment of the present invention, additive (B) is selected from silicas with a specific surface area (BET) in the range from 30 to 800 $m^2/g$.

Preferred precipitated silicas are characterized by a specific surface area of 25 to 800 $m^2/g$, preferably 30-500 $m^2/g$, particularly preferably of 150-450 $m^2/g$ (area meter method ISO 5794-1, annex D). Hydrophobically modified precipitated silicas have a specific surface area of preferably 75-125 $m^2/g$, Area meter method ISO 5794-1, annex D.

In one embodiment of the present invention, the tamped density of precipitated silicas employed is in the range from 50-300 g/l, preferably 75-200 g/l and very particularly preferably 90-150 g/l (determination in accordance with DIN ISO 787/11).

In the case of the precipitated silicas, additive (B) preferably has an average diameter in the range from 1 to 200 µm, preferably 5 to 150 µm, particularly preferably 6 to 120 µm and very particularly preferably from 8 to 20 µm (d50), in each case determined by light scattering according to ISO 13320-1.

Additive (B) in the form of pyrogenic silicas preferably has a specific surface area in the range from 100 to 400 m$^2$/g and average particle diameters of 1 nm-50 nm, based on the primary particles. The primary particles can be present intertwined with one another and form aggregates or agglomerates. The tamped density is ca. 50 to 150 g/l. In one embodiment of the present invention, hydrophobically modified pyrogenic silicas with a specific surface area in the range from 100 to 400 m$^2$/g and an average particle diameter of from 1 nm to 50 nm are selected.

The described silicas can comprise metal ions such as $Ca^{2+}$, $Mg^{2+}$, $Al^{3+}$ or $Fe^{3+}$ in very small amounts, i.e. in each case<6, preferably <5% by weight, preferably less than 3% by weight, particularly preferably less than 2% by weight and particularly preferably less than 1.5% by weight, based on the total weight of the particular silica and determined as oxide. In one embodiment, at least 0.001% by weight of each of the aforementioned metal ions can be present, based on the total weight of the respective silica and determined as oxide. In embodiments in which additive (B) is selected from pyrogenic silicas, the content of metal ions such as $Ca^{2+}$, $Mg^{2+}$, $Al^{3+}$ or $Fe^{3+}$ is at most 0.05% by weight, based on the total weight of the respective silica and determined as oxide, and in the case of the precipitated silicas is at most 1% by weight (baked substance, 2 h at 1000° C.). These do not constitute a required or suitable constituent of the silica, but are impurities present as a result of production. Thus, e.g. the Na content, determined as $Na_2O$ (ISO 3262-18), is <1.5% by weight. Crystalline silicates, sheet silicates and zeolites do not belong to the preferred additives (B).

Preferred metal soaps have a particle diameter (d50) in the range from 1 µm to 100 µm, preferably from 5 µm to 50 µm, based on the primary particles. On account of cohesion forces, these can form aggregates or agglomerates.

The additive (B) has the task of at least partially coating or at least partially covering the primary particle of the aminocarboxylate (A)/of the aminocarboxylates.

In one embodiment, the aminocarboxylate or aminocarboxylates (A) can be present in the form of powders, granules or pellets in the mixture with at least one solid auxiliary (C), where, in the case of the powders, granules or pellets, the particles present then themselves constitute a mixture of aminocarboxylate(s) (A) and auxiliary (C) which appears homogeneous to the naked eye or else by means of light microscopy and the auxiliary, in contrast to additive, does not completely coat or preferably partially coats the primary particle. However, it is also possible for a complete coating of the granule particle or of the pellet particle consisting of aminocarboxylate(s) (A) with a layer of the auxiliary(ies) (C) to be present. Here, a complete coating means a continuous layer of auxiliary(ies) (C) on the aminocarboxylate(s) (A) and not a partial coating, as preferably described for the additive (B).

Auxiliary (C) here can be inorganic or organic in nature and is characterized by a melting point>20° C.

Inorganic auxiliaries (C) can be selected e.g. from the group of detergent builders or detergency builders. These comprise in particular, zeolites with the formula $Na_z[(AlO2)_z(SiO2)_y].xH2O$, in which z and y are integers of at least 6, the ratio of z to y is between 1.0 and about 0.5, and x is an integer from 15 to 264. These zeolites can be of crystalline or amorphous structure, and may be naturally occurring or synthetic. Processes for producing ion exchangers based on aluminosilicate are described in U.S. Pat. No. 3,985,669 and U.S. Pat. No. 4,605,509. Particular preference is given to synthetic, crystalline aluminosilicates, such as zeolite A, zeolite P(B) and zeolite X. In addition, alkali metal silicates, in particular those with an SiO2:Na2O ratio between 1.6:1 and 3.2:1, and also sheet silicates, for example sodium sheet silicates, as described in U.S. Pat. No. 4,664,839, e.g. SKS 6® (Clariant), can be used as auxiliary, bentonites, e.g. Laundrosil® DGA (Südchemie) and kaolin. Also suitable are amorphous sodium silicates with a ratio of $SiO_2$ to $Na_2O$=1:1 to 4:1, in particular from 1.6:1 to 3.2:1 and which comprise e.g. Na orthosilicate, Na metasilicate, disodium disilicate and disodium trisilicate, also crystalline sodium sheet silicates such as canemite, macatite, magadite, kenyaite, natrosilite and in particular delta-disilicate (SKS-6®, Clariant).

Also suitable are carbonates, such as $Na_2CO_3$ and $K_2CO_3$, hydrogencarbonates, such as $NaHCO_3$ and $KHCO_3$, phosphates, in particular pentasodium triphosphate (main constituent of sodium tripolyphosphate), sodium diphosphate (sodium pyrophosphate) and sodium orthophosphate.

Organic auxiliaries (C) are selected from $C_{12}$-$C_{22}$-fatty acids, preferably $C_{16}$-$C_{22}$-fatty acids, such as e.g. tallow fatty acid, stearic acid and behenic acid; $C_{12}$-$C_{22}$-fatty alcohols; polyalkylene glycols with molar masses (Mw) of from 800 to 35 000 g/mol, preferably from 6000 to 35 000 g/mol and particularly preferably from 10 000 to 35 000 g/mol, such as polyethylene glycols, polypropylene glycols, copolymers based on ethylene oxide and propylene oxide; polyalkylene glycols terminally capped once or completely with alkyl groups, such as e.g. methyl polyethylene glycols (MPEGs); waxes such as e.g. polyethylene waxes, polyethylene wax oxidates, montan waxes, paraffin waxes, ester waxes and polyolefin waxes; silicones; partially saponified, water-soluble polyvinyl acetates; polycarboxylic acids in free, partially neutralized or completely neutralized form, in particular polyacrylic acid and acrylic acid-maleic acid copolymers and salts thereof with molar masses of from 2000 g/mol to 100 000 g/mol, particular preference being given here to partially neutralized polycarboxylic acids present as Na salt; surfactants, in particular nonionic surfactants of type $C_{12}$-$C_{22}$-alkylethoxylates with 20 to 200 mol of ethylene oxide, preferably tallow fatty alcohol ethoxylates with 20 to 80 mol of ethylene oxide per mol of tallow fatty alcohol; hydrophobic cationic surfactants, such as $C_{12}$-$C_{22}$-monoalkyltrimethylammoniumchlorides and methosulfates and di-$C_{12}$-$C_{22}$-alkyldimethylammonium-chlorides and methosulfates, e.g. distearyldimethylammonium chloride, and also so-called ester quats which are obtained by the esterification of triethanolamine or of diethanol/methylamine with one to three mol of $C_{12}$-$C_{22}$-fatty acid and subsequent quaternization with methyl chloride or dimethyl sulfate.

Particularly preferred organic auxiliaries (C) can be selected e.g. from $C_{12}$-$C_{22}$-fatty acids, preferably stearic acid, polyalkylene glycols solid at room temperature, in particular polyethylene glycols, with molar masses of from 10 000 to 35 000 g/mol, polycarboxylic acids with molar masses of 4000 g/mol to 20 000 g/mol in partially neutralized form, e.g. Sokalan® PA 25 CL PN and Sokalan® PA 30 CL PN, and tallow fatty alcohol ethoxylates with 20 to 80 mol of ethylene oxide per mol of tallow fatty alcohol. The use of an auxiliary (C) is preferred when aminocarboxylate (A) is to be present in granulated or pelletized form. However, granules and pellets can also be produced therefrom without using an auxiliary (C).

In one embodiment of the present invention, the weight ratio of aminocarboxylate(s) (A) to additive(s) (B) is in total in the range from 9:1 to 9999:1, preferably in the range from 95:5 to 999:1, particularly preferably in the range from 97:3 to 998:2 and very particularly preferably in the range from 98:2 to 995:5.

In one embodiment of the present invention, mixture according to the invention can comprise up to 50% by weight of auxiliary (C), based on the sum of aminocarboxylate(s) (A) and additive(s) (B), preferably 5 to 30% by weight, particularly preferably 10 to 20% by weight.

Auxiliary(ies) (C) can form a continuous phase in granule particle or pellet in which aminocarboxylate (A) is embedded in homogeneously distributed form, or form a coating on the granules or pellet consisting of aminocarboxylate(s) (A).

If the mixture of aminocarboxylate(s) with auxiliary(ies) (A+C) and additive(s) (B) is to be used in detergents for textiles, then the organic auxiliaries (C) are preferably fatty acids and polycarboxylates.

If the mixture of aminocarboxylate(s) with auxiliary(ies) (A+C) and additive(s) (B) is to be used in cleaners for machine dishwashing, then the organic auxiliaries (C) are particularly preferably the weakly foaming or non-foaming substances, in particular polyalkyleneglycols, nonionic surfactants and waxes with a melting range of in each case 40° C. to 60° C., and also polycarboxylates.

Granules (A+C), consisting of aminocarboxylate(s) (A) and auxiliary(ies) (C), can be prepared for example as follows:

(a) after the spray mixing process, in which the aminocarboxylate(s) (A) is/are introduced in granule form or as pellet in a mixer (e.g. plowshare mixer, annular bed mixer, Schugi mixer) and sprayed with (I) a melt or (II) a solution of auxiliary (C) for example in an organic solvent. This process gives granules (A+C) or a pellet (A+C) in which (A) is surrounded with a coating (C). The admixing of additive (B) can then take place.

For the spraying-on, auxiliaries with a melting point between 30° C. and 100° C. are preferred as (I) melts. These include the organic auxiliaries, in particular fatty acids, such as stearic acid, polyalkylene glycols, silicones and nonionic surfactants. The application as (II) solution will take place preferably in the case of inorganic auxiliaries (C), but also in the case of the polycarboxylic acids and their salts. Here, it is necessary to ensure a sufficiently rapid evaporation of the water since the aminocarboxylates are themselves readily water-soluble substances. A spraying-on (II) of the auxiliary (C) in an organic solvent is preferred when it is hydrophobic, has a melting range>100° C. and can be processed under inert gas (nitrogen atmosphere). Examples thereof are the described cationic surfactants which are commercially available in isopropanolic preparation.

(b) via a compaction with subsequent grinding and sieving. For this, in the first step, the aminocarboxylate(s) (A) and the auxiliary(ies) (C) are homogeneously mixed in a mixer (e.g. plowshare mixer). In a second step, the mixture (A+C) is compressed by means of a roll compactor. The compacts are then comminuted/ground and the desired particle size range selected. Of suitability for this purpose are toothed-disk rolls and/or passing sieves. Fines and coarse material are sieved off and returned to the process. Here, the coarse fraction is passed directly to re-comminution and the fines fraction is added to the compacting stage. This process gives granules (compact) (A+C) in which aminocarboxylate(s) (A) and auxiliary(ies) (C) form a homogeneous association. Granules of this type are characterized by a bulk density of greater than 500 g/liter, preferably of greater than 600 g/liter.

(c) as spray granulation in a fluidized-bed apparatus. For this, a preferably aqueous solution of aminocarboxylate(s) and auxiliary(ies) (C) is sprayed onto a pneumatically produced fluidized bed of initial charge of granules (A+C), the water is evaporated and the granules are continuously discharged. This process gives granules (compact) (A+C) in which aminocarboxylate(s) (A) and auxiliary(ies) (C) form a homogeneous association.

(d) in a spray tower. For this, a preferably aqueous solution of aminocarboxylate(s) (A) and auxiliary(ies) (C) is sprayed into a stream of hot air and the solvent, preferably the water, is evaporated. This gives a powder of aminocarboxylate(s) (A) and auxiliary(ies) (C) which looks homogeneous.

(e) in a fluidized-bed apparatus for the purpose of coating. For this, either a (preferably aqueous) solution or a melt of auxiliary(ies) (C) is sprayed onto a pneumatically generated fluidized bed of aminocarboxylate(s) (A) in granule form or pellet form, with (A) being completely coated by (C). During the spraying-on of aqueous solutions, a sufficiently rapid evaporation of the water should be ensured. During the spraying-on of a melt, a heat treatment may be advantageous. This is understood as meaning a heat treatment of the solid in the fluidized bed by means of the gas (air) used, at the same, or below the melting or softening temperature of the particular auxiliary (C). Preference is given to working at a temperature which is just below the melting or softening temperature of the auxiliary (C).

In one preferred embodiment of the present invention, mixture according to the invention comprises neither sulfate nor citrate. This is to be understood as meaning that the maximum content of citrate and sulfate in total is below 500 ppm, based on aminocarboxlyate(s) (A), preferably in total below 50 ppm.

The present invention further provides a process for producing mixtures according to the invention. The production of mixtures according to the invention takes place preferably by mixing aminocarboxylate(s) (A) present as powder, granules or pellets, or a powder-, granule- or pellet-like mixture consisting of aminocarboxylate(s) (A) and auxiliary (C) with additives (B).

Here, the customary particle size of the primary particle comprising aminocarboxylate (A) is in the range 10 to 2500 µm, preferably 20 to 1500 µm, particularly preferably from 50 to 1000 µm and very particularly preferably from 100 to 700 µm.

With regard to the additive (B), "finely divided" is understood as meaning average particle diameters of from 1 nm to 500 µm (as (d50) value, determined by light scattering in accordance with ISO13320-1), preferably 1 nm to 200 µm. Based on precipitated silicas, the average particle size diameter is preferably 1 µm to 200 µm and in the case of pyrogenic silicas is preferably 1 nm-50 nm.

The mixing operation can take place here in customary mixing units, such as e.g. drum mixers, V-blenders, tumble or Turbula mixers, cone mixers (e.g. Nauta mixer), plowshare mixers (Lödige mixer, Eirich mixer). In one preferred embodiment, the mixing process takes place in mixers which exert low shear forces on the material to be mixed, such as e.g. tumble mixers, cone mixers and plowshare mixers.

Preferably, the aminocarboxylate (A) or the aminocarboxylate compound (A+C) is introduced as initial charge, and then the additive (B) is added and then mixed. In order to ensure gentle mixing, the shortest possible mixing times are used. Thus, e.g. for the preparation of 100 g of the mixture according to the invention in a Turbula mixer, a mixing time of 3 minutes is entirely adequate.

If the aminocarboxylates (A) or the aminocarboxylate compounds (A+C) are prepared in powder form by means of spray-drying, the additive (B) is then advantageously metered into the spray tower directly separate from the aqueous solution of the aminocarboxylate (A) or its compound (A+C). Possible sites for the metered addition are the upper end of the spray dryer, a metering connection via a sight glass or the metered addition via the stream of hot air. The same applies in principle for a spray-granulation.

If a metered addition of the additive into the spray tower is not possible, then it can be metered in a separate mixing unit, as described previously.

Should the additive (B) to be mixed into the primary particle (A) comprising aminocarboxylate not be adequately finely divided, thus be available e.g. only as material melted by heating and solidified after pouring into vats, then the primary particle comprising aminocarboxylate (A) can be ground together with the additive (B), during which a thorough mixing of the components is likewise ensured. This is particularly a preferred procedure if the aminocarboxylate is compressed, with or without the addition of an auxiliary (C) by means of a compaction, firstly to give sheets or lumps, which then in any case have to be converted into a finely divided form via a grinding. Of suitability for this process step are in principle all grinding apparatuses, such as e.g. impact mills and cutting mills.

The use concentration of the mixture according to the invention comprising aminocarboxylate (A) or aminocarboxylate-containing compound (A+C) and additive (B) in detergents and cleaners is, based on the aminocarboxylate (A), from 0.1 to 90% by weight, preferably between 1 and 50% by weight, particularly preferably between 3 and 40% by weight, very particularly preferably between 6 and 30% by weight, and specifically preferably between 10 and 25% by weight.

The detergent and cleaner formulations in which the mixture according to the invention can be used are preferably solid detergents, which are in the form of powders, granules, pellets, tablets or washing bars ("bar soaps"). Moreover, however, they can also be incorporated into liquid detergents, washing gels and washing pastes. This is preferably the case when, on account of long transport routes to the user, the aminocarboxylate in question will be acquired in as highly concentrated a form as possible and thus not as an aqueous solution, and on the transport route (e.g. by ship) the product is to be better protected against caking due to moisture absorption.

Detergents and cleaners which comprise mixture according to the invention can moreover comprise further customary constituents. These are described below:

Anionic Surfactants

Suitable anionic surfactants are preferably alkylbenzenesulfonates, alkanesulfonates, olefinsulfonates, alkyl ester sulfonates, alkyl sulfates, alkyl ether sulfates, alkyl carboxylates (soaps) and alkyl phosphates. Suitable counterions M are alkali metal cations, preferably sodium or potassium, or a half equivalent of alkaline earth metal cations, e.g. a half equivalent of calcium or a half equivalent of magnesium, or ammonium $NH_4^+$ and substituted ammonium cations, such as e.g. mono-, di- or triethanolammonium cations, and mixtures of the aforementioned cations thereof.

Alkenyl- or alkylbenzenesulfonates can comprise a branched or linear alkenyl or alkyl group optionally substituted with a hydroxyl group. Preference is given to linear alkyl chains having 9 to 25 carbon atoms and particularly preferably having 10 to ca. 13 carbon atoms.

Alkanesulfonates are available industrially in the form of secondary alkanesulfonates in which the sulfo group is bonded to a secondary carbon atom of the alkyl radical. The alkyl group can in principle be saturated, unsaturated, branched or linear and can be optionally substituted with a hydroxyl group. The preferred secondary alkanesulfonates comprise linear $C_9$ to $C_{25}$-alkyl radicals, preferably $C_{10}$ to $C_{20}$-alkyl radicals and particularly preferably $C_{13}$ to $C_{17}$-alkyl radicals.

Olefinsulfonates are obtained by sulfonation of $C_8$ to $C_{24}$—, preferably $C_{14}$ to $C_{16}$-α-olefins with sulfur trioxide and subsequent neutralization. As a result of the preparation process, these olefinsulfonates can comprise minor amounts of hydroxyalkanesulfonates and alkanedisulfonates.

Alkyl ester sulfonates are derived e.g. from linear esters of $C_8$ to $C_{20}$-carboxylic acids, i.e. fatty acids which are sulfonated with sulfur trioxide. The fatty acids are obtained from natural fats, such as e.g. tallow, coconut oil and palm oil, or may be of a synthetic nature. For detergent and cleaner applications, preference is given to compounds of the formula (1).

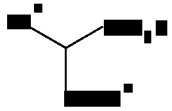

Here, $R^5$ is a $C_8$-$C_{20}$-alkyl radical, preferably $C_{10}$-$C_{16}$-alkyl and $R^6$ is a $C_1$ to $C_6$-alkyl radical, preferably a methyl, ethyl or an isopropyl group. Particular preference is given to methyl ester sulfonates where $R^1$ is $C_{10}$-$C_{16}$-alkyl. M is as defined above.

Suitable alkyl sulfates are surfactants of the formula $R^7OSO_3M$, in which $R^7$ is selected from $C_{10}$-$C_{24}$-alkyl and preferably from $C_{12}$-$C_{18}$-alkyl. M is as described above.

Suitable alkyl ether sulfates have the general structure $R^8O(A)_m SO_3M$, in which $R^8$ is selected from $C_{10}$-$C_{24}$-alkyl and preferably $C_{12}$-$C_{18}$ alkyl radical. A is an alkyoxy unit, preferably ethoxy, and m is a value in the range from ca. 0.5 to ca. 6, preferably in the range from ca. 1 and ca. 3, and M is as defined above.

Alkyl carboxylates are generally known under the name "soaps". Soaps can be based on saturated or unsaturated, preferably native, linear $C_8$ to $C_{18}$-fatty acids.

Further anionic surfactants are salts of acylaminocarboxylic acids, acyl sarcosinates, fatty acid-protein condensation products, which are obtained by reacting fatty acid chlorides with oligopeptides; salts of alkylsulfamidocarboxylic acids; salts of alkyl and alkylaryl ether carboxylic acids; sulfonated polycarboxylic acids, alkyl and alkenyl glycerol sulfates such as oleyl glycerol sulfates, alkylphenol ether sulfates, alkyl phosphates, alkyl ether phosphates, isethionates, such as acyl isethionates, N-acyltaurides, alkyl succinates, sulfosuccinates, monoesters of sulfosuccinates (particularly saturated and unsaturated mono-$C_{12}$-$C_{18}$-alkylesters) and diesters of the sulfosuccinates (particularly saturated and unsaturated di-$C_{12}$-$C_{18}$-alkylesters), sulfates of alkyl polysaccharides such as sulfates of alkyl polyglycosides and alkyl polyethoxycarboxylates such as those of the formula $R^9O(CH_2CH_2)_kCH_2COOM$, in which $R^9$ is selected from $C_8$ to $C_{22}$-alkyl, k is a number selected from 0 to 10 and $M^+$ is as defined above.

Nonionic Surfactants

A distinction is made according to the type of hydrophobic and hydrophilic base:

Addition products of alcohols and ethylene oxide. The alcohols have a $C_8$-$C_{22}$-alkyl group, preferably a $C_{10}$-$C_{18}$-alkyl group, which may be linear or branched, primary or secondary. These are condensed with ca. 1 mol to ca. 25 mol, preferably with ca. 3 mol to ca. 18 mol of ethylene oxide per mole of alcohol.

Addition products of alcohols and ethylene oxide and a further alkylene oxide. These can be built up according to the scheme $R^{10}$—O-EO-AO or $R^{10}$—O-AO-EO, where $R^{10}$ can be a primary or secondary, branched or linear $C_8$ to $C_{22}$-alkyl group, preferably a $C_{10}$ to $C_{18}$-alkyl group, EO is ethylene oxide and AO is an alkylene oxide, preferably propylene oxide, butylene oxide or pentylene oxide.

Addition products of polypropylene glycol and ethylene oxide. The component polypropylene glycol preferably has a molecular weight Mw between ca. 1500 and ca. 1800 g/mol. The addition of up to ca. 40 mol of ethylene oxide onto this hydrophobic moiety leads to amphiphilic compounds.

Addition products of ethylene oxide and a reaction product of propylene oxide and ethylenediamine. The hydrophobic moiety of these compounds consists of the reaction product of ethylenediamine and propylene oxide and generally has a molecular weight Mw of ca. 2500 to 3000 g/mol. Ethylene oxide is added onto this hydrophobic moiety up to a content of ca. 40 to ca. 80% by weight of polyoxyethylene and a total molecular weight Mw of ca. 5000 to 11 000.

Fatty Acid Amides

Suitable fatty acid amides have the general formula $R^{11}$—CO—N($R^{12}$)$_2$, in which $R^{11}$ is an alkyl radical having 7 to 21, preferably 9 to 17, carbon atoms.

The two alkyl radicals $R^{12}$ can be identical or different and, independently of one another, can be hydrogen, $C_1$-$C_4$-alkyl, $C_1$-$C_4$-hydroxyalkyl or $(C_2H_4O)_xH$, where x is selected in the range from 1 to 3. $C_8$-$C_{20}$-amides as monoethanolamides, diethanolamides and diisopropanolamides are preferred.

Semipolar Nonionic Surfactants

Within the context of the present invention the nonionic surfactants also include water-soluble amine oxides, water-soluble phosphine oxides and water-soluble sulfoxides, with at least one $C_8$-$C_{18}$-alkyl radical, preferably a C10 to C14-alkyl radical, which imparts the amphiphilic character to the relevant nonionic surfactant. Preference is given to using $C_{10}$-$C_{18}$-alkyldimethylamine oxides and $C_8$-$C_{12}$-alkoxyethyldihydroxyethylamine oxides in detergents and cleaners.

Further suitable nonionic surfactants are alkyl and alkenyl oligoglycosides, and also fatty acid polyglycol esters or fatty amine polyglycol esters having in each case 8 to 20, preferably 12 to 18 carbon atoms in the fatty alkyl radical, and fatty acid N-alkylglucamides.

Zwitterionic Surfactants

Typical examples of amphoteric and/or zwitterionic surfactants are alkylbetaines, alkylamidobetaines, aminopropionates, aminoglycinates and amphoteric imidazolinium compounds. Particular preference is given to N-alkyl-N,N-dimethyl-N-carboxymethylbetaines, and also N-(alkylamidopropyl)-N,N-dimethyl-N-carboxymethylbetaines, and also alkyldipolyethoxybetaines, in each case with a linear or branched alkyl radical having 8 to 22 carbon atoms, preferably 8 to 18 carbon atoms and particularly preferably having ca. 12 to ca. 18 carbon atoms.

Cationic Surfactants

Examples of cationic surfactants are substituted or unsubstituted straight-chain or branched quaternary ammonium salts of the type $R^{13}N(CH_3)_3^+X^-$, $R^{13}R^{14}N(CH_3)_2^+X^-$, $R^{13}R^{14}R^{15}N(CH_3)^+X^-$ or $R^{13}R^{14}R^{15}R^{16}N^+X^-$. The radicals $R^{13}$, $R^{14}$, $R^{15}$ and $R^{16}$ can preferably be, independently of one another, unsubstituted alkyl with a chain length in the range from 8 to 24 carbon atoms, in particular between 10 and 18 carbon atoms, hydroxyalkyl with ca. 1 to ca. 4 carbon atoms, phenyl, $C_2$- to $C_{18}$-alkenyl, $C_7$- to $C_{24}$-aralkyl, $(C_2H_4O)_xH$, where x is from ca. 1 to ca. 3, alkyl radicals comprising one or more ester groups, or cyclic quaternary ammonium salts. $X^-$ is a suitable anion, for example methyl sulfate, chloride or a half equivalent of sulfate.

Inorganic and/or Organic Builders

These builders can be present with weight fractions of from about 5% to about 80% in detergents and cleaners according to the invention. Inorganic builders comprise, for example, alkali metal, ammonium and alkanolammonium salts of polyphosphates, such as, for example, tripolyphosphates, pyrophosphates, glass-like polymeric metaphosphates, orthophosphates, phosphonates, silicates, carbonates including bicarbonates and sesquicarbonates, sulfates and aluminosilicates.

Aluminosilicate builders are preferred for the present invention. Particular preference is given to zeolites with the formula $Na_z[(AlO_2)_z(SiO_2)_y] \cdot xH_2O$, in which z and y are integers of at least 6, the ratio of z to y is between 1.0 and 0.5, and x is an integer from 15 to 264. Aluminosilicate builders can be of crystalline or amorphous structure, and can be naturally occurring or synthetically produced. Processes for the preparation of aluminosilicate builders are described in U.S. Pat. No. 3,985,669 and U.S. Pat. No. 4,605,509. Particular preference is given to synthetic, crystalline aluminosilicate builders, such as zeolite A, zeolite P(B) and zeolite X.

Further examples of aluminosilicate builders are alkali metal silicates, in particular those with an $SiO_2$:$Na_{2O}$ ratio between 1.6:1 and 3.2:1, and also crystalline sheet silicates, for example crystalline sodium sheet silicates, as described in U.S. Pat. No. 4,664,839, e.g. SKS 6® (Clariant).

Important organic builders are polycarboxylates based on acrylic acid and maleic acid, also builders based on citrate, such as Na citrate and other soluble salts of citric acid.

Suitable organic builders (cobuilders) comprise polycarboxyl compounds such as, for example, ether polycarboxylates and oxydisuccinates, as described in U.S. Pat. No. 3,128,287 and U.S. Pat. No. 3,635,830, and also the "TMS/TDS" builders described in U.S. Pat. No. 4,663,071, also ether hydroxypolycarboxylates, copolymers of maleic anhydride with ethylene or vinyl methyl ether, 1,3,5-trihydroxybenzene-2,4,6-trisulfonic acid and carboxymethyloxysuccinic acid, and also polycarboxylic acids, such as mellitic acid, succinic acid, oxydisuccinic acid, polymaleic acid, benzene-1,3,5-tricarboxylic acid, carboxymethyloxysuccinic acid, and soluble salts thereof.

Bleaches

Detergents and cleaners according to the invention which comprise at least one mixture according to the invention can also comprise one or more bleaches, and also bleach activators, bleach catalysts and suitable stabilizers. The bleaches used are persalts such as perborates (perborate monohydrate, perborate tetrahydrate) and percarbonate. Persalts are usually combined with so-called bleach activators, preferably tetraacetylethylenediamine. Bleach activators are often referred to in the prior art as organic peroxy acid precursors since, as a result of reaction with persalt, they release a peracid, such as e.g. peracetic acid. Depending on the stability of the peracid in question, its state of aggregation and the detergent form, it can be used directly in the detergent. Examples of peroxy acids which are preferred for use in this invention comprise peroxydodecanedioic acid (DPDA), the nonylamide of peroxysuccinic acid (NAPSA), the nonylamide of peroxyadipic acid (NAPAA) and decyldiperoxysuccinic acid (DDPSA), nonanoylamidocaproyloxybenzenesulfonic acid and alkanoyloxybenzenesulfonic acids, such as nonanoyloxybenzenesulfonic acid (NOBS) and lauroyloxybenzenesulfonic acid (LOBS). Particular preference is given to using bleaching systems based on perborate and/or percarbonate with the bleach activator tetraacetylethylenediamine (TAED) in the detergents and cleaners according to the invention.

Furthermore, detergents and cleaners according to the invention can comprise one or more bleach catalysts, for example manganese oxalate dihydrate, or manganese-salen complexes. Detergents and cleaners according to the invention which comprise mixture according to the invention can also comprise customary auxiliaries, which boost the cleaning effect, serve for caring for the textile to be washed, or influence the use properties of the detergent according to the invention. Suitable auxiliaries comprise e.g. enzymes, in particular proteases, lipases, cellulases and amylases, mannanases, glycosidases, furthermore enzyme stabilizers, foam boosters, foam suppressants, tarnish and/or corrosion inhibitors, suspending agents, dyes, fillers, soil-release polymers, optical brighteners, disinfectants, alkalis, hydrotropic compounds, antioxidants, perfumes, solvents, solubility promoters, graying inhibitors, color transfer inhibitors, dispersants, processing auxiliaries, softeners and antistats.

The present invention further provides the use of mixtures according to the invention as or for producing micronutrients (trace nutrient fertilizers). The present invention further provides micronutrients comprising one or more mixtures according to the invention.

Within the context of the present invention, micronutrients are understood as meaning solid mixtures which comprise one or more complexes of boron, iron, manganese, cobalt, copper, zinc or molybdenum. Micronutrients of this type are suitable for agricultural crops (e.g. in the cultivation of wine, fruit and hops) and can be added to a fertilizer in fractions of up to 5% by weight, for example to a Nitrophoska fertilizer.

The present invention further provides the use of mixtures according to the invention for softening liquids, for example water.

EXAMPLES

Example 1

Mixtures of Trilon® A 92 R with an addition of 2% by weight of the hydrophobically modified silica Sipernat® D 17 were prepared. For this, the required amounts of the two components were gently mixed in a container in a tumble mixer for 3 min. To investigate the water absorption and the storage stability resulting therefrom, the mixtures were stored in a climatically controlled cupboard at 38° C./78% relative humidity, and the pourability was assessed visually at regular intervals. For comparison, Trilon® A 92 R was stored without the addition of the silica.

TABLE 1

Storage test of Trilon ® A 92 R with and without the addition of Sipernat ® D 17. Visual assessment at 38° C./78% relative humidity.

| Trilon ® A 92 R | Visual assessment after storage at 38° C./78% relative humidity | | | | | | | |
|---|---|---|---|---|---|---|---|---|
| | 0 hours | 8 hours | 1 day | 2 days | 3 days | 4 days | 5 days | 1 week |
| a) no additive | pourable | stuck together | stuck together, caked | pasty, cloudy mass | pasty, virtually clear mass | storage test ended | — | — |
| b) with 2.0% by weight Sipernat® D 17 | pourable | pourable | pourable | pourable | granules swollen, pourable | granules swollen, pourable | granules swollen, pourable | granules swollen, pourable |

Example 2

Mixtures of Trilon® M SG with an addition of 5% by weight of the hydrophobically modified silica Sipernat® D 10 were prepared. For this, the required amounts of the two components were gently mixed in a container in a tumble mixer for 3 min. To investigate the water absorption and the storage stability resulting therefrom, the mixtures were stored in a climatically controlled cupboard at 35° C./65% relative humidity, and the pourability was assessed visually on a regular basis. For comparison, Trilon® M SG was stored without the addition of the silica.

TABLE 2

Storage test of Trilon ® M SG with and without the addition of Sipernat ® D 10. Visual assessment at 35° C./65% relative humidity.

| Trilon ® M SG | Visual assessment after storage (at 35° C./65% relative humidity | | | | |
|---|---|---|---|---|---|
| | 0 hours | 1 day | 2 days | 3 days | 6 days |
| a) no additive | pourable | completely stuck together, surface encrusted | pasty, cloudy mass | pasty, cloudy mass | — |

TABLE 2-continued

Storage test of Trilon ® M SG with and without the addition of Sipernat ® D 10.
Visual assessment at 35° C./65% relative humidity.

| Trilon ® M SG | Visual assessment after storage (at 35° C./65% relative humidity | | | | |
|---|---|---|---|---|---|
| | 0 hours | 1 day | 2 days | 3 days | 6 days |
| b) with 5% by weight Sipernat ® D 10 | pourable | pourable | pourable | granules swollen, slightly stuck together, majority pourable | granules swollen, stuck together, partly still pourable |

List of Trade Names Used:
Trilon® A 92 R (BASF) Nitrilotriacetate, Tri-Na salt, powder, ca. 92%
Trilon® M SG (BASF) Methylglycine diacetate, Tri-Na salt, granules, min. 76%
Sipernat® D 10 (Evonik) Hydrophobically modified precipitated silica
Sipernat® D 17 (Evonik) Hydrophobically modified precipitated silica

I claim:

1. A mixture, comprising:
particles comprising (A) one or more aminocarboxylate(s); and optionally
(C) at least one solid auxiliary;
wherein
the particles (A) are at least partially coated with (B) an additive selected from the group consisting of cellulose powder, magnesium oxide, talc, tricalcium phosphate, pyrogenic silica and precipitated silicas,
the weight ratio of aminocarboxylate(s) (A) to additive (B) overall ranges from 9:1 to 9999:1,
wherein said mixture is present in pulverulent, granule or pellet form.

2. The mixture according to claim 1, which comprises neither sulfate nor citrate.

3. The mixture according to claim 1, in which the additive (B) has an average particle diameter ranging from 1 nm to 500 μm.

4. The mixture according to claim 1, in which the aminocarboxylate (A) is selected from the group consisting of nitrilotriacetic acid, ethylenediaminetetraacetic acid, diethylenetriaminepentaacetic acid, hydroxyethylethylenediaminetriacetic acid, methylglycinediacetic acid, glutamic acid diacetic acid, 1,3-propylenediaminetetraacetic acid, ethylenediamine-N,N'-bis(2-hydroxyphenylacetic acid), hydroxyethyliminodiacetic acid, iminodisuccinic acid, ethylenediaminedisuccinic acid, and β-alaninediacetic acid.

5. The mixture according to claim 1, in which the additive (B) comprises one of pyrogenic silica and precipitated silicas and a specific surface area of the comprised silica is from 25 to 800 m²/g.

6. The mixture according to claim 5, wherein a tamped density of the comprised silica is from 50 to 300 g/l.

7. A method for producing a detergent, cleaner or care composition comprising incorporating the mixture according to claim 1 into a detergent, cleaner or care composition.

8. A method for producing a micronutrient comprising contacting the mixture of claim 1 with one or more of boron, iron, manganese, cobalt, copper, zinc or molybdenum.

9. A method for softening a liquid comprising adding the mixture of claim 1 to a liquid.

10. A detergent, cleaner or care composition or micronutrient, comprising the mixture according to claim 1.

11. The mixture according to claim 5, wherein the comprised silica is hydrophobically modified.

12. The mixture according to claim 1, wherein a weight ratio of aminocarboxylate(s) (A) to additive (B) overall ranges from 999:1 to 9999:1.

13. A mixture, comprising:
(A) one or more aminocarboxylate(s) selected from the group consisting of nitrilotriacetic acid, ethylenediaminetetraacetic acid, diethylenetriaminepentaacetic acid, hydroxyethylethylenediaminetriacetic acid, methylglycinediacetic acid, glutamic acid diacetic acid, 1,3-propylenediaminetetraacetic acid, ethylenediamine-N,N'-bis(2-hydroxyphenylacetic acid), hydroxyethyliminodiacetic acid, iminodisuccinic acid, ethylenediaminedisuccinic acid, and β-alaninediacetic acid,
wherein
the aminocarboxylate (A) at least partially coated with (B) an additive selected from the group consisting of cellulose powder, magnesium oxide, talc, tricalcium phosphate, pyrogenic silica and precipitated silicas,
and optionally
(C) at least one solid auxiliary;
wherein the weight ratio of aminocarboxylate(s) (A) to additive (B) overall ranges from 9:1 to 9999:1; and
wherein said mixture is present in pulverulent, granule or pellet form.

14. The mixture according to claim 13, wherein the weight ratio of aminocarboxylate(s) (A) to additive (B) overall ranges from 999:1 to 9999:1.

15. The mixture according to claim 13, wherein the weight ratio of aminocarboxylate(s) (A) to additive (B) overall ranges from 95:5 to 9999:1.

16. A mixture, comprising:
(A) one or more aminocarboxylate(s), wherein the particle size of the aminocarboxylate (A) component is from 10 to 2500 microns;
wherein
the particles (A) are at least partially coated with (B) an additive selected from the group consisting of cellulose powder, magnesium oxide, talc, tricalcium phosphate, pyrogenic silica and precipitated silicas,
and optionally
(C) at least one solid auxiliary;
wherein the weight ratio of aminocarboxylate(s) (A) to additive (B) overall ranges from 9:1 to 9999:1.

* * * * *